May 28, 1963    L. E. WOOD    3,091,359
SAFETY PRESSURE RELIEF DEVICE
Filed March 24, 1961

LOREN E. WOOD
INVENTOR.

BY
ATTORNEY

United States Patent Office 3,091,359
Patented May 28, 1963

3,091,359
SAFETY PRESSURE RELIEF DEVICE
Loren E. Wood, Kansas City, Mo., assignor to Black, Sivalls & Bryson, Inc., Kansas City, Mo., a corporation of Delaware
Filed Mar. 24, 1961, Ser. No. 98,035
5 Claims. (Cl. 220—89)

The present invention relates to a safety pressure relief device of the rupturable type in which the device containing a pressure ruptures and provides a relatively large relief area through which complete and immediate pressure relief is accomplished.

Prior to the present invention safety pressure relief devices of the rupturable type have been designed in many varied configurations. These prior devices have required a complicated support member when they were subject to pressure differentials in a direction opposite to the normal pressure differential under which they are designed to rupture to provide pressure relief. These prior support members, when required to support a rupture member against a full vacuum, have been of relatively heavy construction and difficulty has been experienced in obtaining full opening of the support member, particularly in those applications where the design rupture pressure of the rupture member is relatively low. Further, in applications requiring pressure relief in both directions many complicated designs have evolved to provide suitable pressure relief in such applications. Such designs have included mounting two complete units in connection with the pressure systems to be protected with one unit designed to provide pressure relief in one direction and the other unit designed to provide pressure relief in the other direction. In many of these specialized applications the pressure differential at which the units are required to rupture is relatively small. Some of these applications can require that the unit provide pressure relief at as little a pressure differential as seven pounds per square inch. A further requirement which even though generally applicable to all rupturable type safety pressure relief devices has particular importance to these specialized applications is that the units should have a relatively long service life. This requirement dictates that the unit not be subject to creep failure even though it is in service and exposed to pressures approaching its rupture pressure for a long period of time. The term service life or length of time under which a rupturable safety pressure relief device will adequately perform its pressure relieving function without premature failure is a relative matter and in some cases, particularly where temperatures above normal atmospheric temperatures are involved, may be measured in hours and still be considered to be satisfactory. It is with this in mind that the present invention is designed to have a service life which is sufficiently long, taking into account all of the variable conditions to which the device is exposed in operation.

Therefore, the primary object of the present invention is to provide a rupturable type safety pressure relief device suitable to relieve pressure in two directions.

Another object of the present invention is to provide a simplified rupturable type safety pressure relief device having improved protection against failure caused by pressure reversals. A further object of the present invention is to provide a rupturable type safety pressure relief device which will rupture to provide pressure relief in two directions with a single unit. A still further object of the present invention is to provide a rupturable type safety pressure relief device for pressure relief in two directions which will have a relatively long service life and which will not be subject to failures due to creep.

These and other objects of the present invention are hereinafter more fully explained and set forth in the specification and drawings wherein.

Figure 1:
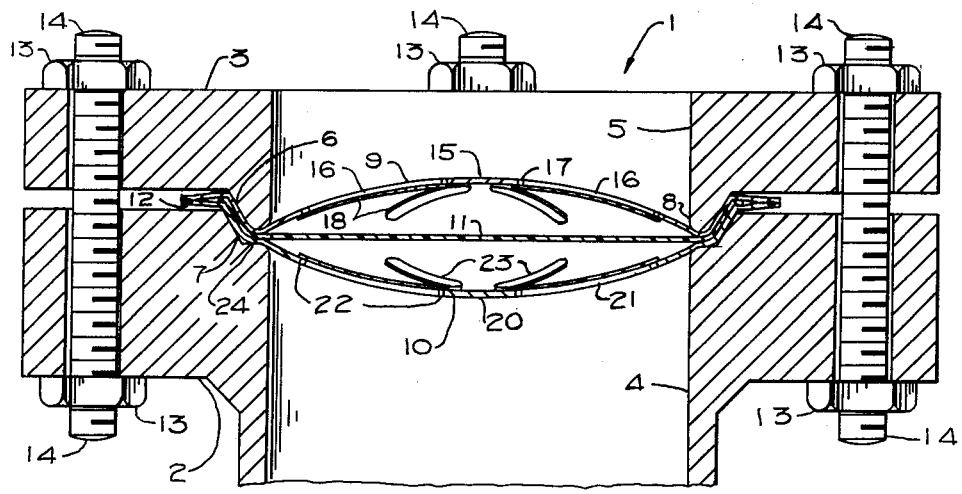
FIG. 1 is a detailed cross sectional view of the device of the present invention shown mounted between flanges.

Referring more in detail to the drawings:

The rupturable safety pressure relief device of the present invention is generally designated at 1 and is mounted between base flange 2 and holddown flange 3 in a position to completely close the relieving area defined by bore 4 of base flange 2 and bore 5 of holddown flange 3. Base flange 2 may be suitably connected into any pressure system whereby the pressure from such pressure system is directly exposed to the side of device 1 within bore 4 of base flange 2. Holddown flange 3 is shown to be a simple holddown member with bore 5 being illustrated as being exposed directly to the atmosphere. Without departing from the spirit or intent of the present invention connection can be made from holddown flange 3 into a second pressure system whereby the pressure from such second pressure system is directly exposed to the side of device 1 within bore 5 of holddown flange 3.

Safety pressure relief device 1 is formed to have a seating surface 6 of the same shape as seat 7 on base flange 2 and lip 8 on holddown flange 3. Device 1 includes upper slotted rupture member 9, lower slotted rupture member 10 and sealing membrane 11. These parts of device 1 are secured together by spot welds 12 around the outer periphery of members 9 and 10. It should be noted that in cases where members 9 and 10 are spot welded together, sealing membrane 11 is trimmed to have a smaller outer diameter than the diameter of the location of spot welds 12. This allows an adequate bond between members 9 and 10 which would not be possible if the edges of sealing membrane 11 were positioned between members 9 and 10 at the point of spot welds 12. It is contemplated that members 9 and 10 may be otherwise suitably secured together such as by soldering or riveting. The securing of members 9 and 10 together is suggested as a way of assuring that sealing membrane 11 is properly positioned between members 9 and 10. If adequate care is taken to properly install members 9 and 10 and sealing membrane 11 between flanges 2 and 3, then it is not necessary that they be secured together. When assembled and placed in proper position between base flange 2 and holddown flange 3, device 1 is maintained in its proper position by tightening nuts 13 on studs 14. However, any suitable means may be used for clamping base flange 2 and holddown flange 3 together with device 1 in proper position therebetween without departing from the purposes of the present invention.

Sealing membrane 11 is preferably made from a resilient material such as polytetrafluoroethylene sheets but may be made from any material which is sufficiently flexible to maintain the seal between the fluid pressure in bore 4 and the fluid pressure in bore 5 when such pressure differential is reversed many times. Generally, it is not believed to be desirable that sealing membrane 11 be metal as most known metals which will flex to the degree required of sealing membrane 11 as hereinafter more fully explained will fail prematurely due to fatigue caused by the flexing.

As shown in FIG. 1 both members 9 and 10 are crowned in their central portion. The crowning height of these two members should be held to a minimum since the material from which sealing membrane 11 is made may have a limit of flexibility which, when exceeded, may cause it to fail thereby causing premature failure of the device 1. A further consideration in adjusting the crown height of these two members 9 and 10 which should be considered is the desired rupture pressure of the device 1 in both directions. It has been found that when all other factors are constant, the bursting pressure of the rupture members 9 and 10 may be varied by varying the crown height to which they are formed initially. It has been found that except for extremely small crown heights approaching a flat condition that an increase in the height of initial forming of the rupture member will cause a slight increase in its rupture pressure. There is a limit at which a further decrease in the crown height will not have any substantial effect toward decreasing the rupturing pressure of the member. Even when the rupture members are originally made flat, they will grow in crown height and become dome shaped and will have approximately the same rupture characteristics as a member which was originally formed to this minimum crown height. Care should be taken in the selection of material for sealing membrane 11 since even though rupture members 9 and 10 are originally formed to have a very shallow crown height accommodating the flexibility characteristics of the selected material, the crown height of these members 9 and 10 will increase in almost all cases when the device is placed in service, whereby additional flexibility is required of sealing membrane 11.

Figure 2:
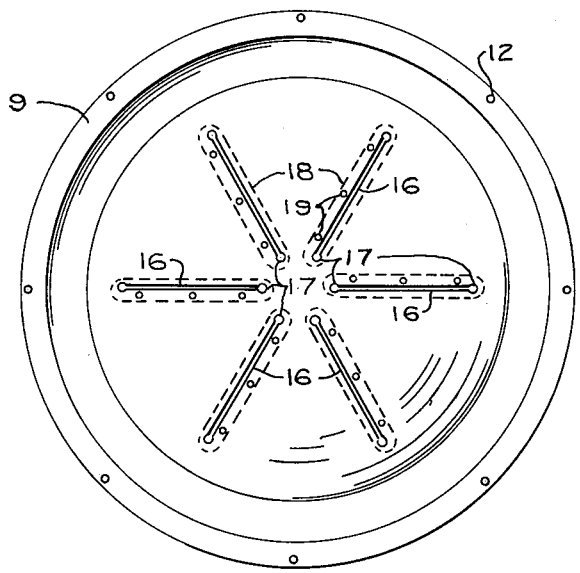
FIG. 2 is a plan view of the device of the present invention.

Upper slotted rupture member 9 is formed at its outer periphery to provide seating surface 6 in cooperation with lower slotted rupture member 10 of device 1 when it is completely assembled. Member 9 has a central crowned portion 15 which as shown in FIG. 2 is provided with a plurality of slots 16. Slots 16 terminate at both ends in perforations 17 which are of larger diameter than the width of slot 16 to prevent any stress concentration in a sharp corner of the slot. It has been found advantageous to utilize perforations 17 since they may be readily located during the fabrication of member 9 and are more easily controlled with regard to their location with respect to each other. The rupture pressure of member 9 is controlled by the proximity of perforations 17 to each other at the center of crowned portion 15 and by other factors such as the thickness or gauge and strength of material used for member 9. Protection elements 18 are positioned in covering relationship to slots 16 and perforations 17 and are spot welded to member 9 on one side only of slots 16 as best shown at 19 in FIG. 2. Upper slotted rupture member 9 should be crowned in the direction shown in FIG. 1 so that its concave side is facing sealing membrane 11.

Lower slotted rupture member 10 is constructed similarly to member 9 whereby it is formed at its outer periphery to provide seating surface 6 in cooperation with upper slotted rupture member 9 and has a central crown portion 20, having slots 21 which terminate at each end in perforations 22. Protection elements 23 are similar to protection elements 18 and are spot welded to member 10 in a manner similar to the spot welds 19 in FIG. 2. Lower slotted rupture member 10 is similar to upper slotted rupture member 9 except that the crown of member 10 is in the opposite direction so that its concave surface faces sealing membrane 11.

In order to preserve the designed rupture pressure of both rupture members 9 and 10, lip 8 on holddown flange 3 is designed to have a radius or other smooth curvature for its juncture with bore 5 and surface 24 of base flange 2 is also rounded in a smooth curve into bore 4. Any sharp corners which could engage either rupture member 9 or 10 would very possibly cause premature rupture of the unit.

When safety pressure relief device 1 is placed in service as illustrated in FIG. 1 between flanges 2 and 3, fluid pressure will normally be exerted through bore 4 of base flange 2 and through slots 21 onto the lower side of sealing membrane 11 causing sealing membrane 11 to assume the dome shape of the concave side of upper slotted rupture member 9. If for any reason the system to which bore 4 is connected changes pressure so that it then contains a pressure less than atmospheric or less than the pressure to which bore 5 is exposed, sealing membrane 11 will then move downwardly against lower slotted rupture member 10 and assume that contour. During operation if the pressure differential in either direction reaches the pressure at which safety pressure relief device 1 is designed to rupture, then the rupture member 9 or 10 against which sealing membrane 11 is held will rupture, allowing sealing membrane 11 to rupture and causing flow of fluids through bores 4 and 5. Any appreciable amount of flow will cause the other of rupture member 9 or 10 which has not previously failed to reverse itself and fail allowing substantially full bore pressure relief of the system.

Care should be taken in the application of safety pressure relief device 1 to avoid having a high pressure relieving rupture pressure if the device is also expected to relieve when certain vacuum conditions occur since under such circumstances rupture member 9 will be substantially stronger than rupture member 10 and even though rupture member 10 fails at the proper vacuum condition, adequate relief of the vacuum conditions in the system being protected may not be available if rupture member 9 is too strong to reverse itself and fail under such conditions.

Safety pressure relief device 1 will operate in substantially the same manner as above described when it is placed in service between two pressure systems as the rupture pressure of rupture member 9 and rupture member 10 are dependent upon the pressure differential between bore 4 and bore 5 rather than the actual pressures existing therein.

Past experience has indicated that construction of rupture members 9 and 10 with slots 16 and 17 as previously described will provide a rupture member capable of having a low rupture pressure and will have excellent resistance to failures due to creep. It is not considered to depart from the novel features of the present invention if rupture members 9 and 10 are constructed to have perforations or a substantially different configuration of slots or slits provided that the design of such rupture members is such that fluid pressure may be transmitted through the rupture member to sealing membrane 11 and provided further that such rupture members have suitable creep characteristics and are reliable in rupturing at or reasonably near their design rupture pressure.

When an application for pressure relief requires protection for pressure reversals approaching fifteen pounds per square inch, it is desirable to use the present invention since slotted rupture member 10 can be made much lighter and easier to open that conventional rupture member vacuum supports. It is also desirable that when device 1 is used to protect against a full vacuum that the rupture pressure of slotted rupture member 9 exceed twenty pounds per square inch to assure full opening of slotted rupture member 10 upon rupture of slotted rupture member 9 and sealing membrane 11.

Thus, from the foregoing it may be seen that the present invention provides a safety pressure relief device which will relieve pressure in either direction, which will protect the rupture member against pressure reversals or vacuums and which will have a very limited possibility of failure because of creep and a relatively long service life.

What I claim and desire to secure by Letters Patent is:
1. A safety pressure relief device comprising,
    a base member,
    a hold-down member,
    a first crowned rupture member,
    a second crowned rupture member,
    a resilient sealing membrane,
    said resilient sealing membrane being positioned between said first crowned member and said second crowned member, said first crowned member being positioned with respect to said second crowned member with its convex side away from said second crowned member, the convex side of said second crowned member being away from said first crowned member, both said first and second crowned members being perforate to allow pressure fluids to pass therethrough to be exerted against said sealing membrane, and means securing said base member to said hold-down member with said first crowned rupture member, said second crowned rupture member and said resilient sealing membrane being positioned between said base member and said hold-down member.

2. A safety pressure relief device according to claim 1 wherein said first crowned rupture member determines the relieving pressure of said device in one direction, and said second crowned rupture member determines the relieving pressure of said device in the direction opposite to said one direction.

3. A safety pressure relief device according to claim 2 wherein said second crowned rupture member has a rupture pressure greater than the pressure to which it will be exposed whereby said second crowned rupture member protects said device from failure due to pressure reversals.

4. A safety pressure relief device according to claim 1 wherein said first crowned rupture member determines the rupture pressure of the device when the fluid pressure passing through said second crowned rupture member exceeds the fluid pressure passing through said first crowned rupture member.

5. A safety pressure relief device comprising, a base member, a hold-down member, a first crowned rupture member, a second crowned rupture member, a resilient sealing membrane, said crowned members having their concave sides facing with said resilient sealing membrane positioned therebetween, both said first and second crowned members being perforate to allow pressure fluids to pass therethrough to be exerted against said sealing membrane, and means securing said base member to said hold-down member with said first crowned rupture member, said second crowned rupture member and said resilient sealing membrane being positioned between said base member and said hold-down member.

References Cited in the file of this patent

UNITED STATES PATENTS

| | | |
|---|---|---|
| 2,194,159 | Bonyun et al. | Mar. 19, 1940 |
| 2,242,547 | Raymond | May 20, 1941 |
| 2,788,794 | Holinger | Apr. 16, 1957 |
| 2,953,279 | Coffman | Sept. 20, 1960 |
| 2,954,897 | Hansen et al. | Oct. 4, 1960 |